United States Patent Office 3,706,807
Patented Dec. 19, 1972

3,706,807
PREPARATION OF ALKYL-SUBSTITUTED
PHENOLS
Robert W. Etherington, Jr., Pennington, and Warren W. Kaeding, Westfield, N.J., assignors to Mobil Oil Corporation
No Drawing. Filed Mar. 20, 1969, Ser. No. 808,986
Int. Cl. C07c 37/12
U.S. Cl. 260—624 C          8 Claims

ABSTRACT OF THE DISCLOSURE

A method of preparing an alkyl-substituted phenol which comprises contacting a phenol with an organic compound having an available alkyl group in the presence of a catalytically-active ZSM-4 zeolite.

BACKGROUND OF THE INVENTION

Field of the invention

This invention relates to the preparation of alkyl-substituted phenols by reactions of a phenol with an organic compound having an available alkyl group in the presence of a catalytically-active zeolite. More particularly, this invention relates to the preparation of benzene and cresols by reaction of toluene and phenol in the presence of a catalyst designated as ZSM-4.

Summary of the invention

A method of preparing an alkyl-substituted phenol which comprises contacting a phenol with an organic compound having an available alkyl group in the presence of a catalytically-active zeolite having the X-ray pattern of Table 1.

DESCRIPTION OF SPECIFIC EMBODIMENTS

It has been found that phenols can react with organic compounds having an available alkyl group over a catalytically-active zeolite to effectuate transalkylation of the available alkyl group which becomes a substituent on the ring of aromatic reactant. Thus, phenol reacts with toluene in the presence of a catalytically-active zeolite described below to form a mixture of cresols and benzene. The phenol reactants can contain other substituents on the ring provided, of course, that the aromatic ring has a hydrogen atom available for substitution for the alkyl group.

The compounds having available alkyl groups which react with phenols pursuant to the present invention include both aliphatic reactants and aromatic reactants. The alkyl group itself can have between 1 and 24 carbon atoms although it generally has between 1 and 4 carbon atoms in the chain. Similarly, other organic compounds having available alkyl groups can be employed in which case the entire alkyl group is transalkylated forming the alkyl-substituted phenol. Exemplary ethyl substituted aromatic compounds include ethylbenzene, ethylnaphthalene as well as substituted ethylbenzene. Other alkylating agents include olefins such as ethylene, propylene, butene and the like, alcohols having between 1 and 24 carbon atoms in the chain especially methanol and ethanol and alkyl halides such as methyl chloride, ethyl chloride and higher homologs.

The reaction conditions will, of course, vary with the specific reactants employed. Generally speaking, the temperature is between 100 and 400° C. preferably between 250 and 320° C. The pressure employed is not particularly critical and need only be sufficient to maintain the reactants in the liquid phase. Generally speaking, a pressure between 300 and 400 p.s.i.g. is preferred.

The transalkylation, in the case of a batch process, is generally formed over a period of at least 0.25 hour, but can be performed over a period of up to 20 hours or more. Preferably the reaction time, in the case of a batch operation, is between .25 and 10 hours. In the case of a continuous process, a liquid hourly space velocity of the reactants over the catalyst between .1 and 10 is suitable, preferably between .1 and 2.

The mole ratio of the organic compound having the available alkyl group to the phenol reactant is generally between .5 and 10, preferably between about 3 and 6. The amount of catalyst employed is generally between about 4 and 100 grams per mole phenol, preferably between 20 and 600 grams per mole of phenol.

The catalysts which can be employed can be in any suitable particle shape. Generally speaking, if the reaction is performed in a batchwise operation, the catalyst is in pelleted form. For continuous synthesis, an extruded form of the catalyst is preferably employed.

Zeolite catalysts which can be employed as transalkylation catalysts for the purposes of the present invention include those catalytically-active members of the family of zeolites known as ZSM-4. The family of ZSM-4 compositions has the characteristic X-ray diffraction pattern set forth in Table 1, hereinbelow. ZSM-4 compositions can also be identified, in terms of mole ratios of oxides, as follows:

$$0.9 \pm 0.2 M_{2/n}O : W_2O_3 : 3\text{--}20 YO_2 : zH_2O$$

wherein M is a cation, n is the valence of said cation, W is selected from the group consisting of aluminum and gallium, Y is selected from the group consisting of silicon and germanium, and z is from 0 to 20. In the as synthesized aluminosilicate form, the zeolite has a formula, in terms of mole ratios of oxides, as follows:

$$0.9 \pm 0.2 M_{2/n}O : Al_2O_3 : 3\text{--}20 SiO_2 : zH_2O$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2 [xR_2O + (1-x)M_{2/n}O] : W_2O_3 : 3\text{--}20 YO_2 : 0\text{--}20 H_2O$$

where W and Y have the previously assigned significance, R is tetramethylammonium, M is an alkali metal carbon and x is between 0.01 and 0.50.

The original cations can be replaced at least in part by ion exchange with another cation. Preferably, the other cation is selected from the group consisting of alkylammonium, e.g., tetramethylammonium, arylammonium, metals, ammonium, hydrogen, thermally treated products of ammonium and/or hydrogen or combinations of any of these cations. Particularly preferred cations of the zeolite are those wherein, in that cationic form, the zeolite has good catalytic activity especially for hydrocarbon conversion. These include hydrogen, rare earth metals, aluminum, metals of groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700° F. In a preferred embodiment of ZSM-4, W is aluminum, Y is silicon and the silica-alumina mole ratio is at least 5 and ranges up to about 15.

Members of the family of ZSM-4 zeolites possess a definite distinguishing crystalline structure whose X-ray diffraction pattern has the following values:

TABLE 1

| Interplanar spacing d(A) | Relative intensity |
|---|---|
| 9.1±.2 | V.s. |
| 7.94±.1 | M.w. |
| 6.90±.1 | M. |
| 5.97±.07 | S. |
| 5.50±.05 | M.w. |
| 5.27±.05 | M.w. |
| 4.71±.05 | M.w. |
| 4.39±.05 | W. |
| 3.96±.05 | W. |
| 3.80±.05 | S. |
| 3.71±.05 | M. |
| 3.63±.05 | M. |
| 3.52±.05 | S. |
| 3.44±.05 | M. |
| 3.16±.05 | S. |
| 3.09±.05 | M. |
| 3.04±.05 | M. |
| 2.98±.05 | M. |
| 2.92±.05 | S. |

These values were determined by standard techniques. the radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and d (obs.) the interplanar spacing in A., corresponding to the recorded lines, were calculated. In Table 1 the relative intensities are given in terms of the symbols: s.=strong, m.=medium, m.s.=medium strong, m.w.=medium weak and v.s.=very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray powder diffraction patterns of several of these forms are set forth below. The ZSM-4 forms set forth below are all aluminosilicates.

Zeolite ZSM-4 can be suitably prepared by preparing a solution containing $R_2O$, sodium oxide, an oxide of aluminum or gallium, an oxide of silicon or germanium, and water and having a composition, in terms of mole ratios of oxides, falling within the following ranges:

TABLE 2

| | Broad | Preferred |
|---|---|---|
| $\frac{Na_2O}{R_2O+Na_2O}$ | .31-<1 | .75-.99 |
| $\frac{R_2O+Na_2O}{YO_2}$ | .05-.90 | .15-.75 |
| $\frac{YO_2}{W_2O_3}$ | 3-60 | 6-30 |
| $\frac{H_2O}{R_2O+Na_2O}$ | 15-600 | 20-150 | wherein R is a tetramethylammonium cation, W is aluminum or gallium and Y is silicon or germanium maintaining the mixture until crystals of the zeolite are formed. Thereafter, the crystals are separated from the liquid and recovered. ZSM-4 is preferably fomed as an aluminosilicate. The composition can be prepared utilizing materials which supply the appropriate oxide. Such compositions include for an aluminosilicate sodium aluminate, sodium silicate, silica hydrosol, silica gel, silicic acid, sodium hydroxide and tetramethylammonium hydroxide. It will be understood that each oxide component utilized in the reaction mixture for preparing a member of the ZSM-4 family can be supplied by one or more initial reactants. For example, sodium oxide can be supplied by an aqueous solution of sodium silicate. The reaction mixture can be prepared either batchwise or continuously. Crystal size and crystallization time of the ZSM-4 composition will vary with the nature of the reaction mixture employed.

Preferably the hydrogen form of ZSM-4 is employed for the purpose of the present invention or in a form resulting from the aforesaid thermal treatment.

In order to more fully illustrate the nature of the present invention and the manner of practicing the same, the following examples are presented:

EXAMPLE 1

A tetramethylammonium sodium ZSM-4 sample was prepared in a 150 gallon steam-jacketed tank. The charge to this crystallizer was made up of two solutions:

(A) SILICATE SOLUTION

| | Pounds |
|---|---|
| 50 weight percent NaOH | 174 |
| $H_2O$ | 298 |
| TMACl (50 weight percent solution) tetramethylammonium chloride | 34.4 |
| Sodium silicate (28.9 weight percent $SiO_2$, 8.9 weight percent $Na_2O$, 62.2 weight percent $H_2O$) Sp. gr. 1.306 at 73° F. | 652 |

(B) ACID SOLUTION

| | Pounds |
|---|---|
| $Al_2(SO_4)_3 \cdot 14H_2O$ (M.W. 595) | 119.3 |
| $H_2SO_4$ (98 percent) | 33.7 |
| $H_2O$ | 296.2 |
| Sp. gr. 1.237 at 77° F. | |

These solutions were mixed together continuously over an hour period flowing these solutions through a mixing nozzle. The flow rates were 5800 cc./min. silicate solution at 180–200° F. while the acid solution was at about 75–80° F. and flowed at 1980 cc./min. The resulting slurry was charged to the 150 gallon crystallizer containing about one pound of seed ZSM-4, from a laboratory preparation, in about 5 gallons of water. This slurry was stirred continuously while the mixture was being charged to the steam jacketed crystallizer. The starting composition (molar ratios) was calculated from the total solutions charged during this one hour period. The amount of solution charged was determined from solutions remaining in the charge tanks. The starting composition was:

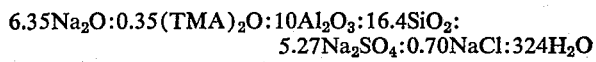

6.35$Na_2O$:0.35$(TMA)_2O$:10$Al_2O_3$:16.4$SiO_2$:
    5.27$Na_2SO_4$:0.70NaCl:324$H_2O$

This mixture was heated to and held at about 215–218° F. for a total of 69 hours. Samples were taken from this mixture every 24 hours and examined by X-ray for crystallinity The 69 hour sample was 110 percent crystalline ZSM-4 compared to an established standard.

Chemical analysis of the resulting product at this point after water washing was:

| | Weight percent |
|---|---|
| Na | [1] 7.31 |
| $Al_2O_3$ | [1] 18.7 |
| $SiO_2$ | [1] 72.5 |
| N | [2] 0.79 |

[1] On dry basis—calcined at 1000° F.
[2] 86.2 weight percent solids.

Product composition as calculated from these analyses was:

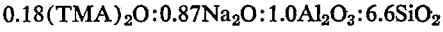

0.18$(TMA)_2O$:0.87$Na_2O$:1.0$Al_2O_3$:6.6$SiO_2$

Preparation of the acid ZSM-4 product

A major portion of this product, about 50 pounds on anhydrous basis, was then processed by ion exchange with $(NH_4)_2SO_4$. This was done in batches and filtered on a rotating one foot x one foot filter. Prior to the $(NH_4)_2SO_4$ exchange, the product slurry was first filtered, then water washed three times with 180–190° F. water, using about 20–25 gallons of water per wash. The $(NH_4)_2SO_4$ exchange consisted of first slurrying the filter cake (88.5 pounds) with 50 pounds $(NH_4)_2SO_4$ in 150 pounds water in a slurry tank heating to 144° F. Filtration was started by pumping the slurry to a rotary filter. Heating was continued by direct addition of live steam to the tank containing the slurry until all the slurry was filtered. This process was repeated three more times and followed by two cycles of washing at about 128–190° F. until the effluent water was essentially free of sulfate ions.

The final exchange product had a residual sodium content of 0.22 weight percent.

EXAMPLE 2

A solution of 23.5 g. phenol (0.25 g. mole) in 92.1 g. of toluene (1.0 g. mole) was dried by azeotropic distillation (toluene-$H_2O$ azeotrope) and placed in a 300 ml. Hastelloy stirred autoclave along with 10 g. of the product of Example 1 which had been preactivated at 400° C. The mixture was blanketed with 50 p.s.i.g. of nitrogen and then heated to 300° C. After four hours at 300° C., the reaction mixture was cooled, removed from the autoclave and analyzed by gas chromatography. Phenol conversion was 20 percent to cresols and 1–2 percent to higher boiling compounds. Toluene conversion was 5 percent to benzene and <1 percent to xylenes.

EXAMPLE 3

A solution of 0.25 g. mole of phenol in one g. mole of ethylbenzene (106.2) was charged to the 300 ml. Hastelloy stirred autoclave along with 10 g. of the zeolite catalyst of Example 1, pressured with 50 p.s.i.g. nitrogen and heated to 300° C. (autogenous pressure 320 p.s.i.g. at 300° C.). After four hours at 300° C., the reaction mixture was cooled, removed from the autoclave and analyzed by gas chromatography. Phenol conversion was 45 percent to ethylphenols and 4 percent to diethylphenols. Ethylbenzene conversion was 11.4 percent to benzene, 3.6 percent to diethylbenzenes, and 2.2 percent to more highly alkylated hydrocarbons.

EXAMPLE 4

Several different reactions of one mole of toluene with 0.25 mole phenol over ZSM–4 catalyst in the hydrogen form were conducted at various temperatures and times to determine conversion and selectivity of the reaction to produce benzene and cresols. Set forth below is a table showing the effect of temperature and time upon the conversion and selectivity of the reaction.

TABLE 3

| Temperature, °C. | Time, hrs. | Conversion, percent | Selectivity, percent |
|---|---|---|---|
| 250 | 2 | 1 | |
| 300 | 2 | 15 | >90 |
| 300 | 4 | 20 | >90 |
| 300 | 16 | 35 | 80–90 |

The good conversion and selectivity achieved through use of the specific catalyst in the light of the nature of the reactants is especially surprising. Specifically, polar molecules such as phenol have a strong tendency to readily deactivate zeolite catalysts. The reason for this observed phenomenon in relation to other catalysts is not fully understood. However, it is believed that due to the polarity of the compounds, a shield is built up over the catalytically-active sites insulating it and preventing the catalyst from exerting its catalytic properties on the reaction. Thus, high conversion and selectivity in a transalkylation reaction of the type involved in the present invention utilizing a highly polar molecule, phenol, is unexpected and surprising.

Another unexpected observed phenomenon is the ability to perform the reaction over a substantial period of time without any loss in selectivity. Accordingly, the present process is particularly unique in its ability to convert polar reactants with a zeolite catalyst.

The terms and expressions used herein have been used as terms of description and not of limitation, as there is no intention, in the use of such terms and expressions, of excluding any equivalents, or portions thereof, as there are many modifications and departures possible within the scope of the invention claimed.

I claim:

1. In the method of preparing an alkyl-substituted phenol by contacting a phenol having an available hydrogen atom on the ring with an organic compound having an available alkyl group, the improvement which comprises carrying out the reaction in the presence of a catalytically-active product resulting from thermal treatment, at a temperature of at least about 700° F., of a zeolite having an X-ray diffraction pattern substantially as shown in Table 1, said zeolite being further identified, in terms of mole ratios of oxides, as follows:

$$0.9 \pm 0.2 M_{2/n}O : Al_2O_3 : 5-15 SiO_2 : 0-20 H_2O$$

wherein M is a cation selected from the group consisting of ammonium, hydrogen, arylammonium or alkylammonium and $n$ is the valence of said cation.

2. An improvement according to claim 1 wherein said organic compound having an available alkyl group is ethylbenzene.

3. An improvement according to claim 1 wherein said phenol is phenol.

4. An improvement according to claim 1 wherein said organic compound having an available alkyl group is toluene.

5. An improvement according to claim 4 wherein toluene is contacted with phenol for a period of at least 0.1 hour and up to 20 hours at a temperature between 100 and 400° C. while the reactants are in the liquid phase.

6. An improvement according to claim 5 wherein the mole ratio of said toluene to said phenol is between .5 and 10 and the amount of catalyst present is between about 4 and 100 grams per mole phenol.

7. An improvement according to claim 6 wherein the mole ratio of toluene to phenol is between about 3 and 6 and the amount of catalyst is between 20 and 600 grams per mole of phenol.

8. An improvement according to claim 1 wherein said zeolite is in its hydrogen form.

References Cited

UNITED STATES PATENTS

| 3,201,486 | 8/1965 | Bielawski et al. | 260—624 R X |
| 3,211,670 | 10/1965 | Kaplan et al. | 260—624 C X |
| 3,518,317 | 6/1970 | Shooter et al. | 260—621 R |

FOREIGN PATENTS

| 1,402,823 | 5/1965 | France | 252—455 Z |
| 1,430,117 | 1/1966 | France | 252—455 Z |
| 1,436,206 | 3/1966 | France | 252—455 Z |
| 1,553,622 | 12/1968 | France | 252—455 Z |
| 1,117,568 | 6/1968 | Great Britain | 260—455 Z |

BERNARD HELFIN, Primary Examiner

N. MORGENSTERN, Assistant Examiner

U.S. Cl. X.R.

252—438, 455 Z; 260—621 R